US011366281B2

(12) United States Patent
Ito (10) Patent No.: US 11,366,281 B2
(45) Date of Patent: Jun. 21, 2022

(54) LENS APPARATUS INCLUDING A PLURALITY OF LENS GROUPS AND IMAGE PICKUP APPARATUS (71) Applicant: CANON KABUSHIKI KAISHA, Tokyo (JP)

(72) Inventor: Hiroki Ito, Hiratsuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 344 days.

(21) Appl. No.: 16/789,753

(22) Filed: Feb. 13, 2020

(65) Prior Publication Data
US 2020/0264400 A1 Aug. 20, 2020

(30) Foreign Application Priority Data

Feb. 18, 2019 (JP) .............................. JP2019-026684

(51) Int. Cl.
G02B 7/02 (2021.01)
G02B 9/04 (2006.01)
(Continued)

(52) U.S. Cl.
CPC ............... *G02B 7/022* (2013.01); *G02B 7/10* (2013.01); *G02B 9/04* (2013.01); *G02B 15/142* (2019.08); *G03B 17/14* (2013.01)

(58) Field of Classification Search
CPC ........ G02B 7/022; G02B 7/10; G02B 15/144; G02B 7/04; G02B 9/04; G02B 15/142;
(Continued)

(56) References Cited

U.S. PATENT DOCUMENTS 6,115,190 A 9/2000 Hirai
2003/0072089 A1* 4/2003 Yasutomi ............... G02B 7/102
359/701
(Continued)

FOREIGN PATENT DOCUMENTS

CN 101118310 A 2/2008
CN 101813817 A 8/2010
(Continued)

OTHER PUBLICATIONS

Study on Zoom Mechanisms of Thermal Imagers, Wei-feng Zhang, et al., Kunming Institute of Physics, Kunming 650223, China, Infrared Technology, vol. 37, No. 12, Dec. 2015. (Abstract Only Translation).
(Continued)

Primary Examiner — Alicia M Harrington
(74) Attorney, Agent, or Firm — Cowan, Liebowitz & Latman, P.C.

(57) ABSTRACT

A lens apparatus that can secure a necessary lens moving distance while avoiding growing in size and that is able to firmly hold a lens. The lens apparatus comprises a first lens group holding member, a second lens group holding member, an exterior cylinder disposed on an outer peripheral side of the first lens group holding member, a first cam cylinder disposed to be rotatable around an optical axis and movable in an optical axis direction corresponding to a rotation angle, a guide cylinder having a diameter fitting portion rotatably holding the first cam cylinder around the optical axis, and a second cam cylinder. The exterior cylinder does not have a cam groove or a guide groove for guiding another member, and is driven to a position at which part of the exterior cylinder is exposed to an outside corresponding to a rotation angle of the second cam cylinder.

16 Claims, 9 Drawing Sheets (51) Int. Cl.
*G02B 7/10* (2021.01)
*G03B 17/14* (2021.01)
*G02B 15/14* (2006.01)

(58) Field of Classification Search
CPC .......... G03B 17/14; G03B 3/02; G03B 17/12; H04N 5/2254
See application file for complete search history.

(56) References Cited

U.S. PATENT DOCUMENTS

| | | |
|---|---|---|
| 2015/0043089 A1 | 2/2015 | Uemura |
| 2017/0176705 A1 | 6/2017 | Wang et al. |

FOREIGN PATENT DOCUMENTS

| | | |
|---|---|---|
| CN | 101887159 A | 11/2010 |
| CN | 101988981 A | 3/2011 |
| CN | 102478696 A | 5/2012 |
| CN | 102998768 A | 3/2013 |
| CN | 103529535 A | 1/2014 |
| CN | 104698568 A | 6/2015 |
| CN | 105449974 A | 3/2016 |
| CN | 106980165 A | 7/2017 |
| CN | 107748433 A | 3/2018 |
| JP | 2000-111786 A | 4/2000 |
| JP | 2000-275505 A | 10/2000 |
| JP | 2008-233771 A | 10/2008 |
| JP | 2010-197698 A | 9/2010 |
| JP | 2016-138959 A | 8/2016 |

OTHER PUBLICATIONS

The above U.S. Patent Document #1, U.S. Patent Application Publication Documents #1-2, Foreign Patent Documents #1-15, and Non-Patent Literature document #1 were cited in the Jan. 21, 2022 Chinese Office Action, which is enclosed with an English Translation, that issued in Chinese Patent Application No. 202010090285.8.

* cited by examiner

FIG. 9

LENS APPARATUS INCLUDING A PLURALITY OF LENS GROUPS AND IMAGE PICKUP APPARATUS

BACKGROUND OF THE INVENTION

Field of the Invention

The present invention relates to a lens apparatus and an image pickup apparatus including a plurality of lens groups.

Description of the Related Art

A lens barrel of an image pickup apparatus having a zoom mechanism capable of changing the shooting angle by changing the interval of the optical axis direction of a plurality of lenses is known (see, for example, Japanese Laid-Open Patent Publication (kokai) No. 2000-111786). A single lens barrel with a high-magnification zoom function that can perform shooting from wide-angle to telephoto is highly convenient and has a wide range of needs.

However, a lens barrel having a high-magnification zoom function tends to have a complicated configuration because the number of retractable stages increases when attempting to secure a lens moving distance in order to improve performance in the telephoto state. As a result, it is difficult to firmly hold the lens in the lens barrel, and the entire lens barrel may be increased in size.

SUMMARY OF THE INVENTION

The present invention provides a lens apparatus that can easily secure a necessary lens moving distance while avoiding growing in size and is able to firmly hold a lens.

Accordingly, the present invention provides a lens apparatus comprising a first lens group, a first lens group holding member configured to hold the first lens group and having a first cam follower, a second lens group, a second lens group holding member configured to hold the second lens group and having a second cam follower, an exterior cylinder disposed on an outer peripheral side of the first lens group holding member and having a third cam follower and a fourth cam follower, a first cam cylinder having a first cam groove engaged with the first cam follower, a second cam groove engaged with the second cam follower, and a third cam groove engaged with the third cam follower, the first cam cylinder being disposed to be rotatable around an optical axis and movable in an optical axis direction corresponding to a rotation angle, a guide cylinder having a first guide groove engaged with the first cam follower, a second guide groove engaged with the second cam follower, a third guide groove engaged with the third cam follower, and a diameter fitting portion configured to rotatably hold the first cam cylinder around the optical axis, and a second cam cylinder having a fourth cam groove engaged with the fourth cam follower, wherein one of the guide cylinder and the first cam cylinder has a fifth cam follower, and the other of the guide cylinder and the first cam cylinder has a fifth cam groove engaged with the fifth cam follower to have a displacement in the optical axis direction corresponding to a rotation angle of the first cam cylinder, and the exterior cylinder does not have a cam groove or a guide groove for guiding another member, and is driven to a position at which part of the exterior cylinder is exposed to an outside corresponding to a rotation angle of the second cam cylinder.

According to the present invention, it is possible to commercialize a lens apparatus having a simple structure that can secure a necessary lens moving distance while avoiding growing in size and that is able to firmly hold a lens.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. Here, the case Where the lens apparatus according to the present invention is applied to a lens barrel (hereinafter referred to as "interchangeable lens") that can be attached to and detached from the camera body of a single-lens reflex camera will be described.

Figure 1:
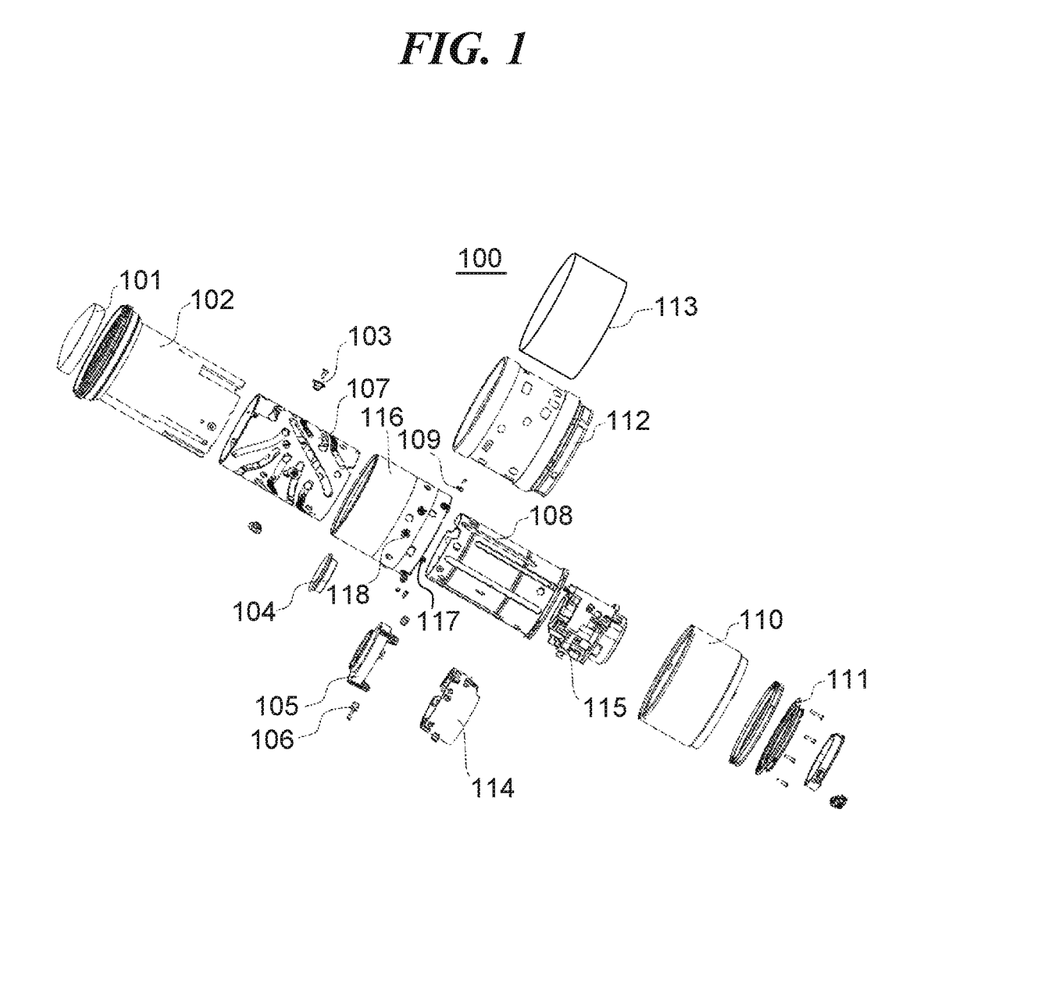
FIG. 1 is an exploded perspective view of an interchangeable lens according to an embodiment.
Figure 2:
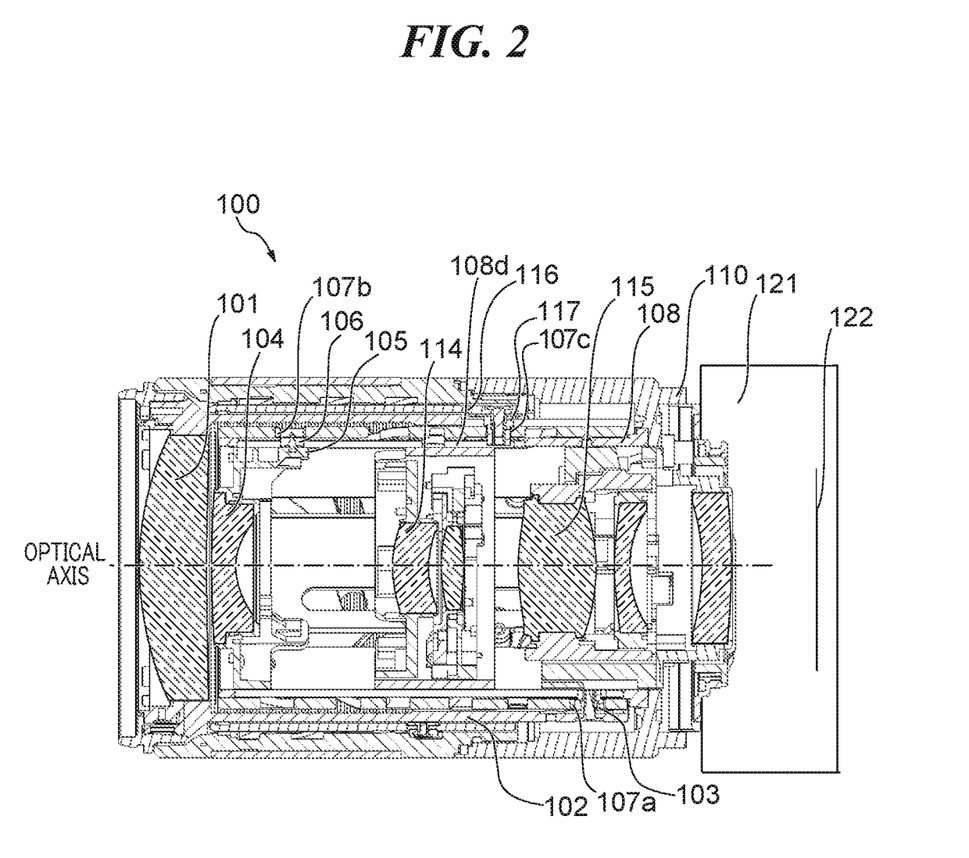
FIG. 2 is a cross-sectional view showing a schematic configuration of an image pickup apparatus having an interchangeable lens in a WIDE state.

FIG. 1 is an exploded perspective view of an interchangeable lens 100 according to an embodiment. FIG. 2 is a cross-sectional view showing a schematic configuration of an image pickup apparatus in which the interchangeable lens 100 is mounted on a camera body 121. The interchangeable lens 100 is in a so-called WIDE (wide, wide-angle) state. The camera body 121 has an image pick up sensor 122 (image pickup device) such as a COMS image sensor at a position where an image is formed by light passing through the interchangeable lens 100. It should be noted that the configuration of the camera body 121 is not directly related to the present invention, and thus detailed description thereof is omitted.

The interchangeable lens 100 includes a first lens group 101, a second lens group 104, a third lens group 114, and a fourth lens group 115 that constitute an optical system in the interchangeable lens 100. The interchangeable lens 100 also includes a first lens group holding member 102, a first cam follower 103, a second lens group holding member 105, a second cam follower 106, a first cam cylinder 107, a guide cylinder 108, a fifth cam follower 109 and a fixing cylinder 110 are provided. Further, the interchangeable lens 100 includes a mount member 111, a second cam cylinder 112, a rubber member 113, and an exterior cylinder 116.

The first lens group 101, the second lens group 104, the third lens group 114, and the fourth lens group 115 each perform a zooming operation by being driven independently along the optical axis. The first lens group holding member 102 holds the first lens group 101. The second lens group holding member 105 holds the second lens group 104. It should be noted that each of the third lens group 114 and the fourth lens group 115 is similarly held by the lens group holding member.

The guide cylinder 108 is disposed inside the first cam cylinder 107 and is fixed to the fixing cylinder 110 with a screw or the like. Therefore, the guide cylinder 108 cannot move in the optical axis direction, and the rotation around the optical axis is also restricted. The fifth cam follower 109 is fixed to the guide cylinder 108 with a screw or the like.

The mount member 111 is a component that allows the interchangeable lens 100 to be attached to and detached from the camera body 121, and is fixed to the fixing cylinder 110 with a screw or the like. The second cam cylinder 112 is a component that also serves as an operation member of the interchangeable lens 100, and also serves as an exterior member. The second cam cylinder 112 can be rotated by a bayonet with respect to the fixing cylinder 110, but the movement in the optical axis direction is restricted. The rubber member 113 is fit with the second cam cylinder 112, and is a component that allows the user to perform an operation without slipping (improves operability) when rotating the second cam cylinder 112 as an operation member.

The first cam follower 103 is formed of a female screw at the center, and is fixed to the inner peripheral of the first lens group holding member 102 by screwing the male screw from the outer peripheral side with the first lens group holding member 102 interposed therebetween. The first cam follower 103 is engaged with a first cam groove 107a provided in the first cam cylinder 107 and a first guide groove 108b provided in the guide cylinder 108. It should be noted that the first cam followers 103 are equally provided in three phases in a plane orthogonal to the optical axis.

The second cam follower 106 is screwed and fixed to a screw hole provided in the second lens group holding member 105 so as to protrude to the outer peripheral of the second lens group holding member 105. The second cam follower 106 is engaged with a second cam groove 107b provided in the first cam cylinder 107 and a second guide groove 108c provided in the guide cylinder 108.

The first cam cylinder 107 is engaged with the guide cylinder 108 at a diameter fitting portion 108a provided on the guide cylinder 108, and is held rotatably with respect to the guide cylinder 108 around the optical axis. As a result, when the first cam cylinder 107 rotates, the first lens group holding member 102 to which the first cam follower 103 is attached is guided by the first cam groove 107a, and moves back and forth in the optical axis direction along the first guide groove 108b without rotating around the optical axis. Similarly, when the first cam cylinder 107 rotates, the second lens group holding member 105 to which the second cam follower 106 is attached is guided by the second cam groove 107b, and moves in the optical axis direction along the second guide groove 108c without rotating around the optical axis. It should be noted that a description in more detailed structure will be given of the first cam cylinder 107 and the guide cylinder 108.

Figure 3:
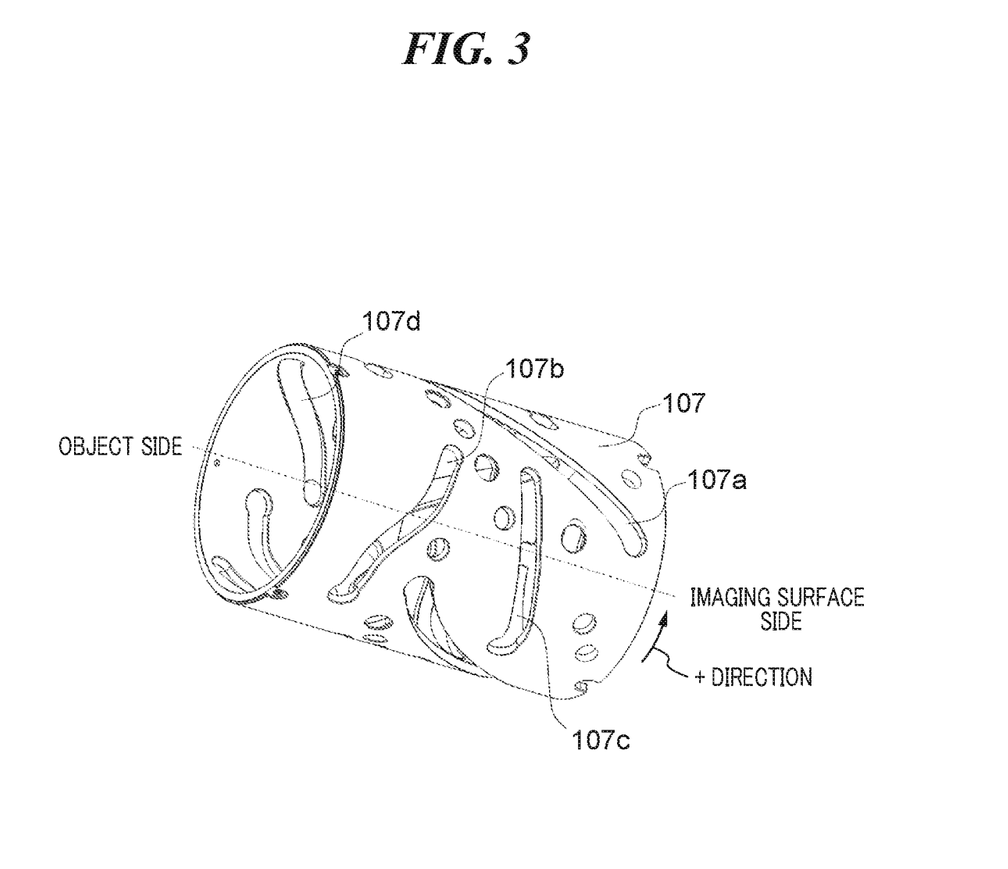
FIG. 3 is a perspective view of a first cam cylinder provided in the interchangeable lens.

The exterior cylinder 116 is disposed outside the first lens group holding member 102 and includes a third cam follower 117 on the inner peripheral surface and a fourth cam follower 118 on the outer peripheral surface. The third cam follower 117 is composed of a female thread at the center, equally disposed in three phases in a plane perpendicular to the optical axis, and attached to the exterior cylinder 116 by screwing a male screw from outside with the exterior cylinder 116 interposed. The third cam follower 117 is engaged with a third cam groove 107c provided in the first cam cylinder 107 and a third guide groove 108d provided in the guide cylinder 108. The fourth cam follower 118 is engaged with a fourth cam groove 112a provided in the second cam cylinder 112, FIG. 3 is a perspective view of the first cam cylinder 107. The first cam cylinder 107 has a cylindrical shape, and its curved surface (cylindrical surface) includes the first cam groove 107a, the second cam groove 107b, the third cam groove 107c, and a fifth cam groove 107d. Each cam groove is equally formed in three phases in a circumferential manner as in each cam follower described earlier, and has a displacement in the optical axis direction corresponding to the rotation angle of the first cam cylinder 107. The first cam groove 107a and the second cam groove 107b are for driving the first lens group 101 and the second lens group 104 to an optical position corresponding to the zooming operation, and are formed of a so-called nonlinear cam groove in which the inclination angle changes in the middle region of each cam groove.

The third cam groove 107c has a gradient toward the object as an average gradient angle with respect to the rotation angle phase in the + (plus) direction shown in FIG. 3, and formed of a non-linear cam in which the inclination angle changes in the middle region. As in the third cam groove 107c, the fifth cam groove 107d has a gradient toward the imaging surface as an average gradient angle with respect to the rotation angle phase in the + direction shown in FIG. 3, and formed of a non-linear cam in which the inclination angle changes in the middle region.

It should be noted that although detailed explanation is omitted, the first cam cylinder 107 is provided with the cam grooves that are engaged via the cam followers provided in each of the holding members of the third lens group 114 and the fourth lens group 115. As a result, the third lens group 114 and the fourth lens group 115 is movable to an optical position corresponding to the zooming operation corresponding to the rotation angle of the first cam cylinder 107.

Figure 4:
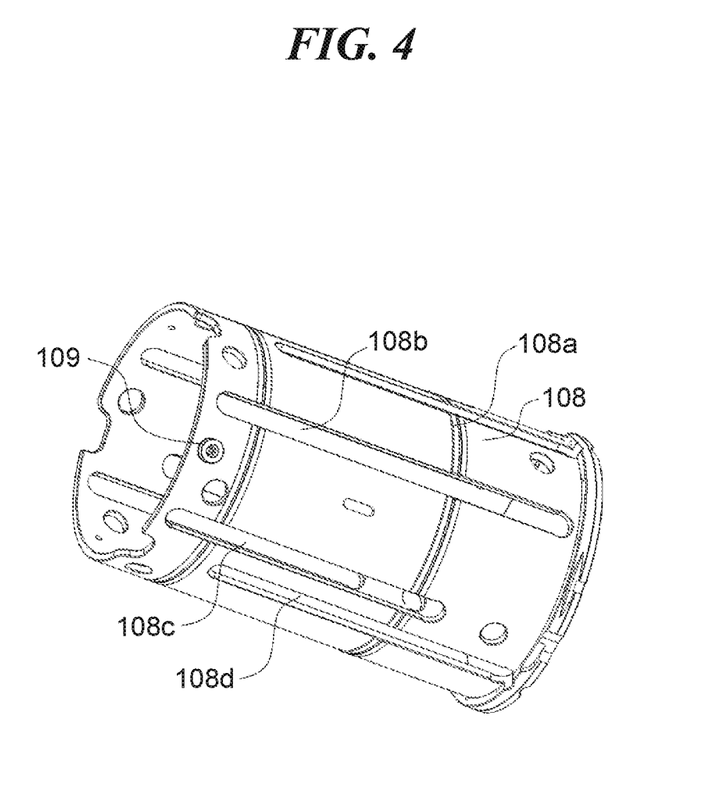
FIG. 4 is a perspective view of a guide cylinder provided in the interchangeable lens.

FIG. 4 is a perspective view of the guide cylinder 108. The guide cylinder 108 is provided with the first guide groove 108b that is engaged with the first cam follower 103, the second guide groove 108c engaged with the second cam follower 106, and the third guide groove 108d that is engaged with the third cam follower 117. As in the cam grooves provided in the first cam cylinder 107, the respective guide grooves are equally formed in three phases in the circumferential shape. It should be noted that although the guide cylinder 108 is provided with the first guide groove 108b, the second guide groove 108c, and the third guide groove 108d independently, any one of the guide grooves may be used as the another guide groove.

A fifth cam follower 109 provided in the guide cylinder 108 is engaged with the fifth cam groove 107d of the first cam cylinder 107. It should be noted that the fifth cam follower 109 may be provided in either one of the guide cylinder 108 or the first cam cylinder 107, and the fifth cam groove may be provided in the other. Therefore, in contrast to the present embodiment, the guide cylinder 108 may be provided with the fifth cam groove, and the first cam cylinder 107 may be provided with the fifth cam follower.

Figure 5:
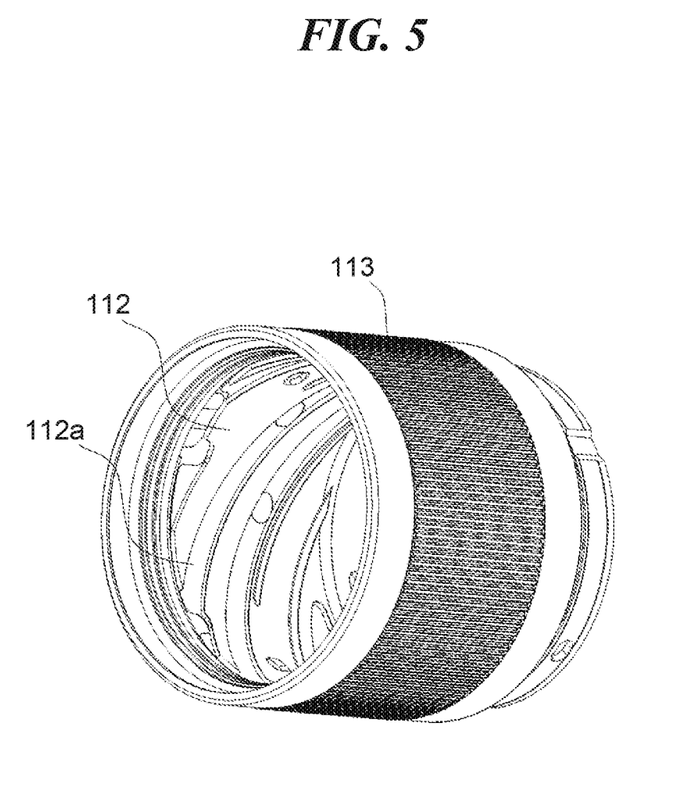
FIG. 5 is a perspective view of a second cam cylinder provided in the interchangeable lens.

FIG. 5 is a perspective view of the second cam cylinder 112. The rubber member 113 is attached to the outer diameter portion (outer periphery) of the second cam cylinder 112. The fourth cam groove 112a is formed on the inner peripheral surface of the second cam cylinder 112. It is sufficient that the fourth cam groove 112a has at least three phases for driving the exterior cylinder 116. However, by increasing the number of the fourth cam grooves 112a, it enables to disperse an external force that acts on the fourth cam follower 118 when the external force such as an impact or the like acts on the interchangeable lens 100 from the outside. Therefore, the second cam cylinder 112 is provided with the fourth cam groove 112a in six phases.

The second cam cylinder 112 can be manufactured by cutting or die-casting a metal material, but the manufacturing cost can be reduced by resin molding. Therefore, the second cam cylinder 112 is manufactured by resin molding. However, when the zooming operation is performed by the user manually rotating the second cam cylinder 112 that is the operation unit as in the interchangeable lens 100, it is necessary to suppress occurrence of a parting line resulting from resin molding in the fourth cam groove 112a. This is because when the parting line is generated in the fourth cam groove 112a, a sense of incongruity is transmitted to the user's hand when getting over the stepped portion of the parting line. For this reason, when producing the second cam cylinder 112 by resin molding, it is desirable not to use a mold having a structure (so-called slide structure) in which an inner diameter portion in which a parting line is generated in the cam groove is divided. In order to avoid decreasing operability, it is desirable to use a mold having a structure in which the cam groove is configured as an integral mold (a so-called rotationally demolding structure). When the second cam cylinder 112 is produced by resin molding using a mold with a rotationally demolding structure, it is necessary to make the inclination angle of the fourth cam groove 112a constant in order to avoid undercutting in the mold release process. Therefore, the fourth cam groove 112a is a so-called linear cam with a constant inclination angle.

Figure 6:
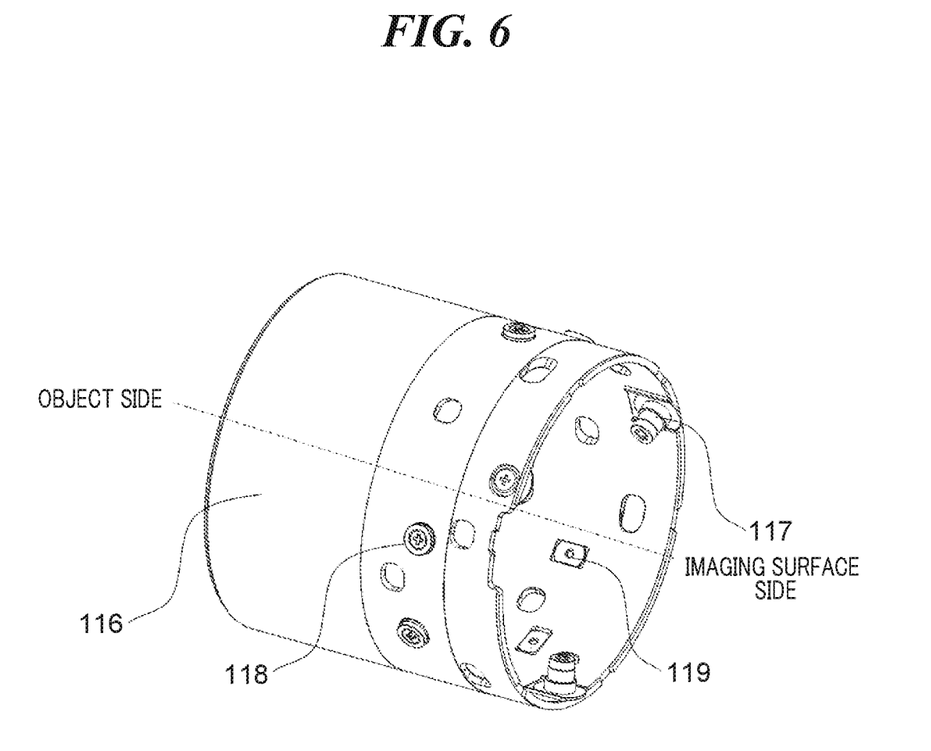
FIG. 6 is a perspective view of an exterior cylinder provided in an interchangeable lens.

FIG. 6 is a perspective view of the exterior cylinder 116. As described earlier, the fourth cam follower 118 is attached to the outer peripheral surface of the exterior cylinder 116, and (the fourth cam follower 118) is engaged with the fourth cam groove 112a of the second cam cylinder 112. As in the fourth cam groove 112a, the fourth cam follower 118 is provided on the circumference in six phases. A nut member 119 is disposed on the inner diameter side of the exterior cylinder 116, and a screw that passes through the fourth cam follower 118 disposed on the outer peripheral surface of the exterior cylinder 116 is screwed to the nut member 119 from the outer peripheral side, so that the fourth cam follower 118 is fixed to the exterior cylinder 116. As described earlier, the third cam follower 117 is fixed to the inner diameter side of the exterior cylinder 116.

Figure 7:
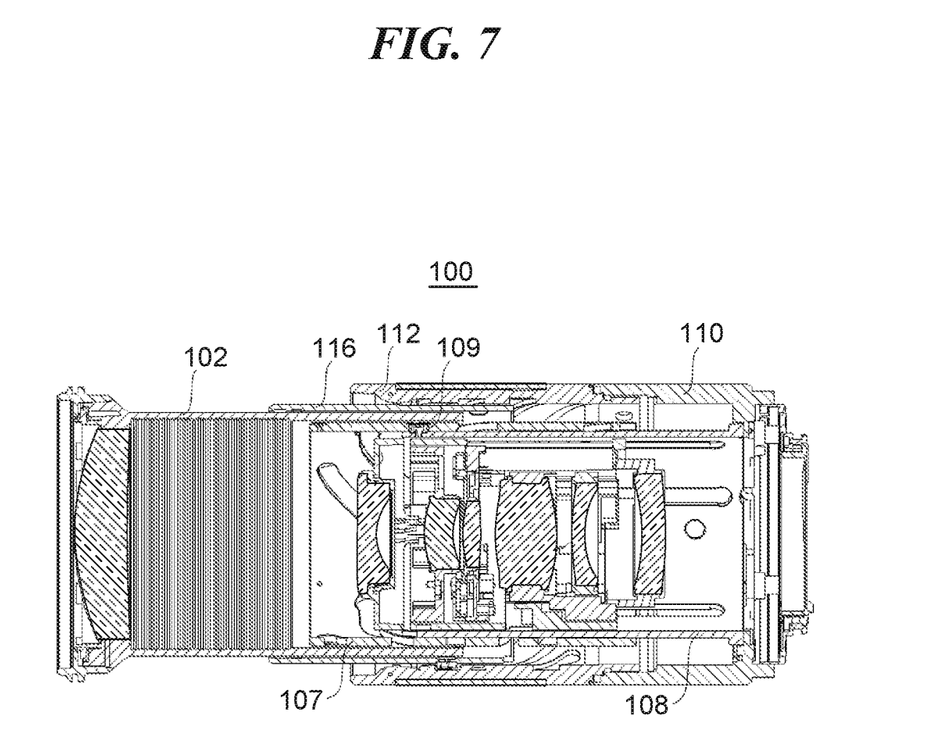
FIG. 7 is a first cross-sectional view showing a schematic configuration of an interchangeable lens in a TELE state.

FIG. 7 is a cross-sectional view showing a schematic configuration when the interchangeable lens 100 is in a so-called TELE (tele, telephoto) state, and shows a cross section passing through an optical axis (not shown). As described earlier, the first cam cylinder 107 is fit in the guide cylinder 108 and the diameter fitting portion 108a, and is held rotatably around the optical axis. The fifth cam groove 107d of the first cam cylinder 107 is engaged with the fifth cam follower 109 provided in the guide cylinder 108. Therefore, the first cam cylinder 107 is movable back and forth in the optical axis direction along the fifth cam groove 107d while rotating.

Further, the first lens group holding member 102, the second lens group holding member 105, and respective holding members of the third lens group 114 and the fourth lens group 115 are held by the first cam cylinder 107 and the guide cylinder 108. Therefore, when the first cam cylinder 107 rotates, each lens group holding member moves back and forth in the optical axis direction along the engaged cam groove. In this way, each lens group holding member is integrally held by the guide cylinder 108 and the first cam cylinder 107 without any other members interposed between the guide cylinder 108 and the first cam cylinder 107. Thus, in the interchangeable lens 100, an optical system is constructed in which each lens group (lens group holding member) is firmly held with a simple structure. As a result, each lens group can be moved back and forth in the optical axis direction with high accuracy without growing in size of the entire interchangeable lens 100.

Further, each lens group holding member is movable in the optical axis direction the amount (distance) obtained by adding the amount of extension of the first cam cylinder 107 and the displacement amount of the cam groove engaged with the cam follower provided in each lens group holding member. That is, the interchangeable lens 100 has a structure in which a large amount of displacement of each lens group holding member in the optical axis direction can be obtained, and thereby a high zoom magnification can be obtained.

Since the exterior cylinder 116 is disposed outside the first lens group holding member 102, part of the exterior cylinder 116 is exposed to the outside and constitutes part of the exterior when the interchangeable lens 100 is in the TELE state as shown in FIG. 7. Here, as described earlier, the exterior cylinder 116 includes the third cam follower 117 and the fourth cam follower 118, and the third cam follower 117 is engaged with the third guide groove 108d of the guide cylinder 108. For this reason, the exterior cylinder 116 is movable in the optical axis direction, but its rotation around the optical axis is restricted. Further, since the fourth cam follower 118 is engaged with the fourth cam groove 112a of the second cam cylinder 112, the exterior cylinder 116 moves linearly in the optical axis direction along the fourth cam groove 112a when the second cam cylinder 112 is rotated.

Further, as described earlier, the third cam follower 117 is engaged with the third cam groove 107c of the first cam cylinder 107. The third cam groove 107c has a gradient toward the object as an average gradient angle with respect to the rotation angle phase in the + direction shown in FIG. 3. Therefore, when the exterior cylinder 116 moves in the optical axis direction, the first cam cylinder 107 rotates along the third cam groove 107c. That is, when the second cam cylinder 112 is rotated by a user operation, the exterior cylinder 116 moves straight back and forth in the optical axis direction, so that the first cam cylinder 107 moves back and forth in the optical axis direction while rotating, whereby, each lens group moves back and forth in the optical axis direction.

Figure 8:
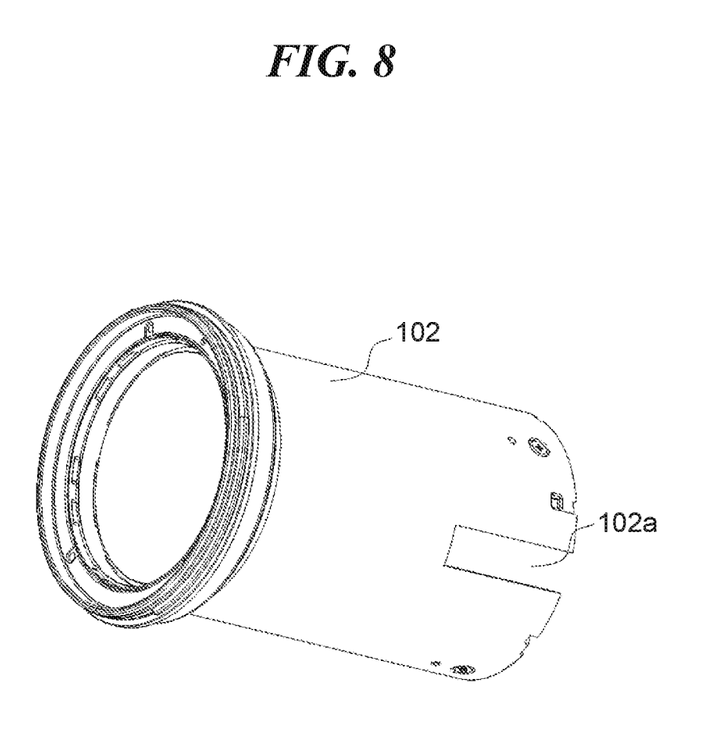
FIG. 8 is a perspective view of a first lens group holding member provided in the interchangeable lens.

FIG. 8 is a perspective view of the first lens group holding member 102. A cutout portion 102a is provided between the first cam followers 103 that are equally disposed in three phases in a plane orthogonal to the optical axis in the inner peripheral surface of the first lens group holding member 102. The cutout portion 102a is provided so that the third cam follower 117 and the first lens group holding member 102 are in non-contact with each other when the interchangeable lens 100 is in the WIDE state (FIG. 2) in which a large overlapping area between the first lens group holding member 102 and the exterior cylinder 116 in the radial direction exists. Therefore, the cutout portion 102a is provided in three phases as in the third cam follower 117. When the first lens group holding member 102 and the exterior cylinder 116 are relatively moved in the optical axis direction, the third cam follower 117 moves in the optical axis direction in the inside of the cutout portion 102a in the region where the first lens group holding member 102 and the third cam follower 117 overlap in the optical axis direction.

Figure 9:
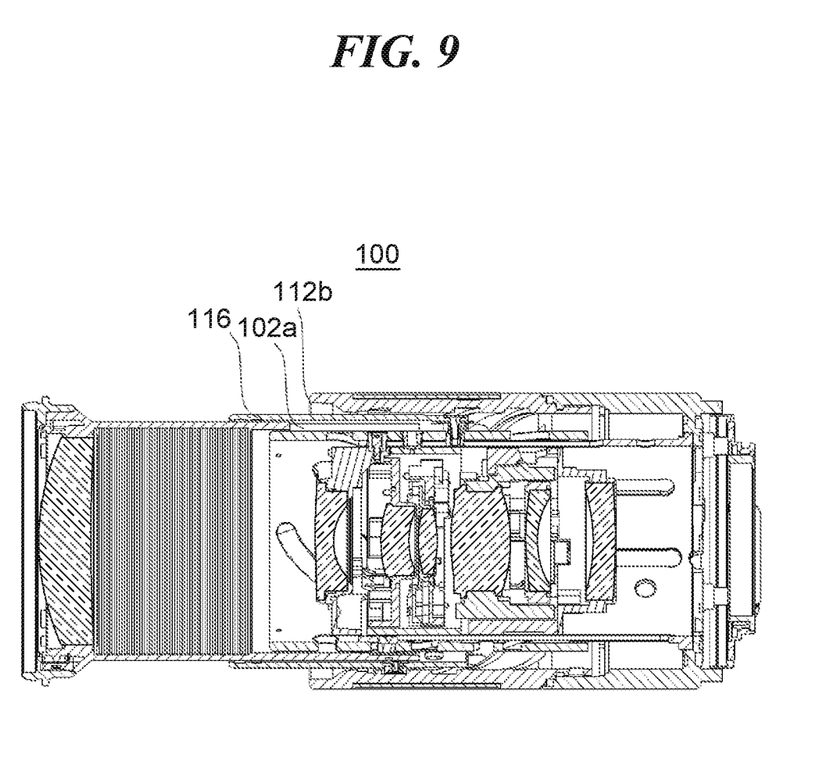
FIG. 9 is a second cross-sectional view showing a schematic configuration of the interchangeable lens in the TELE state.

FIG. 9 is a cross-sectional view showing a state where the interchangeable lens 100 is in the TELE state, and shows a cross section passing through the optical axis (not shown) and the cutout portion 102a. The cutout portion 102a provided in the first lens group holding member 102 is located closer to the object than the object side distal end portion 112b of the second cam cylinder 112.

Here, a configuration without the exterior cylinder 116 is considered. In this case, when the cutout portion 102a has a portion located closer to the object than the distal end portion 112b of the second cam cylinder 112, it arises a problem that unnecessary light enters the inside of the interchangeable lens 100 from the portion and degrades optical performance. In addition, dust and the like enter the inside of the interchangeable lens 100 from the outside, so that there is a possibility that a shadow due to dust or the like is reflected in an image, and that mechanical sliding of each component is hindered may leads to the retraction/feeding operation being hindered. To avoid this problem, the interchangeable lens 100 is provided with the exterior cylinder 116, so that the configuration is such that the cutout portion 102a is not exposed to the outside in any states of the WIDE state and the TELE state.

The interchangeable lens 100 is assumed to be a telephoto zoom lens or a high-magnification zoom lens in which the travel distance (or displacement) of the first lens group 101 in the optical axis direction between the WIDE state and the TELE state is relatively long. In the case where the zooming operation is manually performed as in the interchangeable lens 100, generally, when the travel distance (or displacement) of the lens group gets longer, the torque required for the manual operation is increased and operability is degraded. As a measure to reduce the torque in the rotation operation, it is common to increase the rotation angle of the first cam cylinder 107 to increase the rotation length of each cam groove, and to decrease the cam inclination angle. This is because, generally, when the cam inclination angle exceeds a certain angle, the operation gets extremely heavy due to the relationship of the friction coefficient between the cam groove and the cam follower.

However, when the rotational length of the cam groove is increased in the interchangeable lens 100, the number of cam grooves provided in the first cam cylinder 107 is large (see FIG. 3), so that there is a problem that the cam grooves interfere with each other. As a result, in order to provide the cam groove in the first cam cylinder 107 as described earlier, it is necessary to suppress the rotation length.

On the other hand, in the interchangeable lens 100, it is possible to set the rotation angles of the first cam cylinder 107 and the second cam cylinder 112 to different angles by transmitting the rotation of the second cam cylinder 112 to the first cam cylinder 107 via the exterior cylinder 116. As a result, the operation torque of the user can be reduced. Therefore, in the interchangeable lens 100, the rotation angle of the second cam cylinder 112 operated by the user is set larger than the rotation angle of the first cam cylinder 107 in order to reduce the torque in the rotation operation.

For the setting of the first cam groove 107a and the second cant groove 107b in the first cam cylinder 107, the arrangement of the optical member for obtaining a desired zoom magnification is prioritized over the optimization of the torque when the second cam cylinder 112 is rotated. Therefore, the torque acting on each of the first cam groove 107a and the second cam groove 107b changes corresponding to the zoom range. To solve this problem, the third cam groove 107c and the fourth cam groove 112a can be made to have an inclination angle that matches the torque non-uniformity in the zoom range, so that the operation torque can be made uniform. For example, in the range where the torque for driving the first lens group 101 and the second lens group 104 is large, the operating torque can be reduced by increasing the inclination angle of the fifth cam groove 107d and the third cam groove 107c and by reducing the inclination angle of the fourth cam groove 112a. It should be noted that for the convenience of manufacturing the second cam cylinder 112 by resin molding as described earlier, it is necessary to make the inclination angle of the fourth cam groove 112a constant. In this case, the third cam groove 107c or the fifth cam groove 107d has a non-linear cam curve, so that the operation torque can be made uniform.

In interchangeable lens 100, as described earlier, since it is necessary to provide a large number of cam grooves in the first cam cylinder 107, the rotation length is limited, and in addition, due to the frictional force acting between the cam groove and the cam follower, it is not easy to take a large displacement in the optical axis direction with respect to the rotation length of the cam groove. Therefore, it is not easy to secure the amount of displacement necessary for driving the first lens group 101 in the optical axis direction only by the amount of displacement of the first cam groove 107a. Therefore, in the interchangeable lens 100, the displacement amount of the first cam cylinder 107 is added to the displacement amount of the first lens group 101 by displacing the first cam cylinder 107 in the optical axis direction along the fifth cam groove 107d. That is, the first lens group 101 can be driven in the optical axis direction by a displacement amount obtained by adding the displacement amount of the fifth cam groove 107d to the displacement amount of the first cam groove 107a.

As described earlier, the interchangeable lens 100 has a simple configuration in which there are no members interposed between each lens group holding members, and also between the guide cylinder 108 and the first cam cylinder 107. As a result, each lens group (lens group holding member) can be firmly held, and each lens group can be moved back and forth in the optical axis direction with high accuracy. In the interchangeable lens 100, even when the fourth cam groove 112a is linear, it is possible to make the operation torque uniform when rotating the second cam cylinder 112 by making either the third cam groove 107c or the fifth cam groove 107d a non-linear cam curve. Further, in the interchangeable lens 100, the operating torque can be reduced by setting the rotation angle of the first cam cylinder 107 to be smaller than the rotation angle of the second can cylinder 112.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Further, each of the above-described embodiments is merely an embodiment of the present invention, and the embodiments can be appropriately combined.

For example, the lens apparatus according to the present invention is not limited to an interchangeable lens for a single-lens reflex camera, but also can be applied to a lens barrel such as that of a compact camera or the like in which a camera body and a lens barrel are integrally (non-detachably) formed. In addition, the lens apparatus according to the present invention is not limited to the image pickup apparatus, but also can be applied to other optical devices such as a telescope. Furthermore, in the interchangeable lens 100 mentioned earlier, although the second cam cylinder 112 also serves as an operation member, then operation member prepared as a separate member from the second cam cylinder 112 may be coupled to the second cam cylinder 112 by bonding, caulking, or the like.

This application claims the benefit of Japanese Patent Application No. 2019-026684, filed on Feb. 18, 2019 which is hereby incorporated by reference herein in its entirety.

What is claimed is:

1. A lens apparatus comprising:
a first lens group;
a first lens group holding member configured to hold said first lens group and having a first cam follower;
a second lens group;
a second lens group holding member configured to hold said second lens group and having a second cam follower;
an exterior cylinder disposed on an outer peripheral side of said first lens group holding member and having a third cam follower and a fourth cam follower;
a first cam cylinder having a first cam groove engaged with the first cam follower, a second cam groove engaged with the second cam follower, and a third cam groove engaged with the third cam follower, said first cam cylinder being disposed to be rotatable around an optical axis and movable in an optical axis direction corresponding to a rotation angle;
a guide cylinder having a first guide groove engaged with the first cam follower, a second guide groove engaged with the second cam follower, a third guide groove engaged with the third cam follower, and a diameter fitting portion configured to rotatably hold said first cam cylinder around the optical axis; and
a second cam cylinder having a fourth cam groove engaged with the fourth cam follower,
wherein one of said guide cylinder and said first cam cylinder has a fifth cam follower, and the other of said guide cylinder and said first cam cylinder has a fifth cam groove engaged with the fifth cam follower to have a displacement in the optical axis direction corresponding to a rotation angle of said first cam cylinder, and
said exterior cylinder does not have a cam groove or a guide groove for guiding another member, and is driven to a position at which part of said exterior cylinder is exposed to an outside corresponding to a rotation angle of said second cam cylinder.

2. The lens apparatus according to claim 1, wherein the rotation angle of said first cam cylinder is smaller than the rotation angle of said second cam cylinder.

3. The lens apparatus according to claim 1, wherein a cutout portion configured to make said first lens group holding member in non-contact with the third cam follower is provided in said first lens group holding member.

4. The lens apparatus according to claim 3, wherein in a state where part of the cutout portion is located closer to an object than an object side distal end of said second cam cylinder, a portion of the cutout portion is covered with said exterior cylinder, the portion being located closer to the object than the object side distal end of said second cam cylinder.

5. The lens apparatus according to claim 1, wherein said second cam cylinder is formed with resin, and the fourth cam groove has no parting line.

6. The lens apparatus according to claim 1, wherein the fourth cam groove is formed with a constant inclination angle.

7. The lens apparatus according to claim 1, wherein the third cam groove or the fifth cam groove is formed so that an inclination angle changes.

8. The lens apparatus according to claim 7, wherein in a range where inclination angles of the third cam groove and the fifth cam groove are increased, an inclination angle of the fourth cam groove is reduced.

9. The lens apparatus according to claim 1, wherein a displacement amount of the fifth cam groove in the optical axis direction is larger than a displacement amount of the third cam groove in the optical axis direction.

10. An image pickup apparatus comprising:
a lens apparatus according to claim 1; and
an image pickup device disposed at a position where an image is formed by light passing through said lens apparatus.

11. A lens apparatus comprising:
a first lens group holding member configured to hold a first ens group and having a first cam follower;
a second lens group holding member configured to hold a second lens group and having a second cam follower;
an exterior cylinder disposed on an outer peripheral side of said first lens group holding member and having a third cam follower;
a first cam cylinder having a first cam groove engaged with the first cam follower, a second cam groove engaged with the second cam follower, and a third cam groove engaged with the third cam follower, said first cam cylinder being disposed to be rotatable around an optical axis and movable in an optical axis direction; and
a guide cylinder having a first guide groove engaged with the first cam follower, a second guide groove engaged with the second cam follower, a third guide groove engaged with the third cam follower, and a diameter fitting portion configured to rotatably hold said first cam cylinder around the optical axis,
wherein said first cam cylinder moves back and forth in the optical axis direction while rotating corresponding to a movement of said exterior cylinder in the optical axis direction with engagement between the third cam follower and the third cam groove, and the third cam follower and the third guide groove,
said first lens group holding member moves back and forth in the optical axis direction corresponding to a rotation of said first cam cylinder with engagement between the first cam follower and the first cam groove, and the first cam follower and the first guide groove, and
said second lens group holding member moves back and forth in the optical axis direction corresponding to the rotation of said first cam cylinder with engagement between the second cam follower and the second cam groove, and the second cam follower and the second guide groove.

12. The lens apparatus according to claim 11, wherein said exterior cylinder has a fourth cam follower, the lens apparatus further comprises a second cam cylinder having a fourth cam groove engaged with the fourth cam follower and disposed rotatably around the optical axis, and said exterior cylinder moves back and forth in the optical axis direction with engagement between the fourth cam follower d the fourth cam groove by rotating said second cam cylinder.

13. The lens apparatus according to claim 12, wherein
one of said guide cylinder and said first cam cylinder has a fifth cam follower, and the other has a fifth cam groove engaged with the fifth cam follower to have a displacement in the optical axis direction corresponding to a rotation angle of said first cam cylinder, and an amount of displacement by which said first lens group holding member is capable of moving back and forth in the optical axis direction is an amount of displacement obtained by adding a displacement amount of the first cam groove to a displacement amount of the fifth cam groove in the optical axis direction.

14. The lens apparatus according to claim 12, wherein
said exterior cylinder does not have a cam groove and a guide groove for guiding another member, and is driven to a position at which part of said exterior cylinder is exposed to an outside corresponding to a rotation angle of said second cam cylinder.

15. The lens apparatus according to claim 12, wherein
the lens apparatus further comprises a third lens group holding member configured to hold a third lens group and a fourth lens group holding member configured to hold a fourth lens group, and a cam follower provided in said third lens group holding member is engaged with another cam groove formed in said first cam cylinder and is engaged with another guide groove formed in said guide cylinder, a cam follower provided in said fourth lens group holding member is engaged with still another cam groove formed in said first cam cylinder and is engaged with still another guide groove formed in said guide cylinder, and said third lens group holding member and said fourth lens group holding member move back and forth in the optical axis direction corresponding to the rotation of said first cam cylinder.

16. An image pickup apparatus comprising:
a lens apparatus according to claim 11; and
an image pickup device disposed at a position where an image is formed by light passing through said lens apparatus.

* * * * *